(No Model.)

G. DELKER.
Spring Vehicle.

No. 234,254.   Patented Nov. 9, 1880.

Attest:
Geo. T. Smallwood Jr.
Walter Allen

Inventor:
George Delker
By Knight Bros
Attys.

N. PETERS, PHOTO-LITHOGRAPHER, WASHINGTON, D C.

UNITED STATES PATENT OFFICE.

GEORGE DELKER, OF HENDERSON, KENTUCKY.

SPRING-VEHICLE.

SPECIFICATION forming part of Letters Patent No. 234,254, dated November 9, 1880.

Application filed April 19, 1880. (No model.)

*To all whom it may concern:*

Be it known that I, GEORGE DELKER, a citizen of the United States, residing at Henderson, in the county of Henderson and State of Kentucky, have invented a new and useful Improvement in Spring-Vehicles, of which the following is a specification.

My invention relates to certain improvements in side-bar or side-spring vehicles, whereby I am enabled to suspend phaeton-shaped bodies on ordinary side springs or side bars.

To accomplish this I employ rigid end supports, suitably curved, extending from the upwardly-projecting and overhanging ends of the phaeton-body to connect the same with the spring attachments and support it thereon, and I also prefer to employ supplemental longitudinal supporting or tie bars extending from end to end under the sides of the body and connecting with the said curved supports or braces; but the said supplemental or tie bars may be dispensed with.

In order that my invention may be fully understood, I will proceed to describe it with reference to the accompanying drawings, in which—

Figure 1:
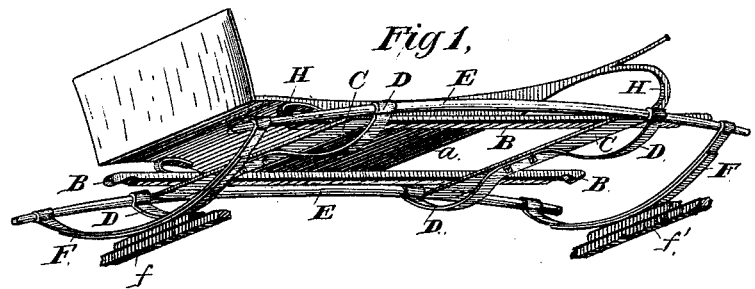
Figure 2:
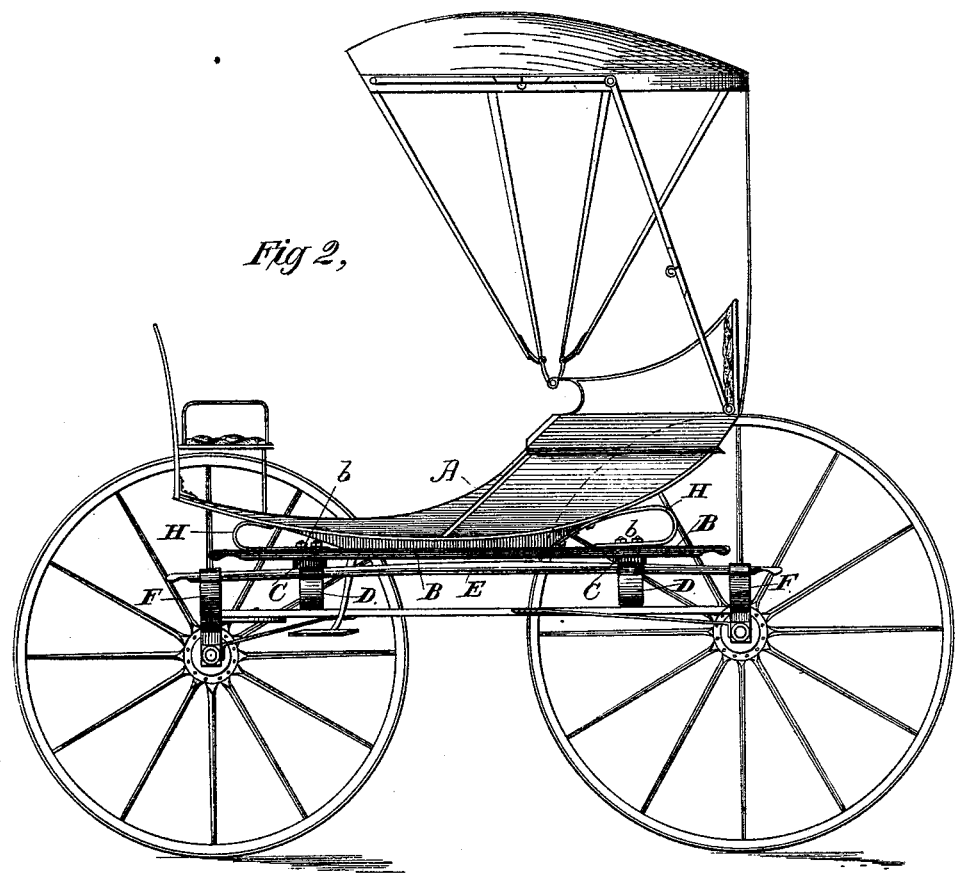

Figure 1 is an under-side perspective view of the running-gear of a buggy embodying my improvements. Fig. 2 is a side elevation of the same, the two nearer wheels being removed.

A represents a body, phaeton-shaped or with upwardly-projecting ends, to which are rigidly secured iron supports H H, curved, as shown, in bow or goose-neck from, and fastened at their lower ends to any customary side-bar or side-spring attachments.

B B are supplemental supporting or tie bars bolted at their central parts beneath each side of the flat portion *a* of the sides of the body A, and at their extremities fastened to and preferably interposed between the supports H H and cross-bars C C, which rest upon springs D, hanging from side bars, E, which are supported, by the customary springs F, on the bolster *f* and rear axle, *f'*.

By these means I am enabled to support phaeton-shaped bodies upon side bars or side springs with as much stability as if elliptic springs were used, thus securing the advantages possessed by side-bar vehicles of a low-hanging body and large front wheels, and at the same time producing a light and artistic effect.

This arrangement produces a lady's vehicle convenient to mount and easy to ride in, while it is at the same time light and graceful in design.

Having thus described my invention, the following is what I claim as new therein and desire to secure by Letters Patent:

1. The body A, having its ends higher than its middle portion, mounted, through the medium of end supports, H H, on an ordinary side-bar or side-spring system, substantially as described.

2. The combination of the phaeton-shaped body A, longitudinal bars B B, and supports H H with a side-spring or side-bar system, substantially as set forth.

GEORGE DELKER.

Witnesses:
W. F. FULWILER,
T. F. CHEANEY.